United States Patent
Feuillade et al.

(10) Patent No.: US 10,934,451 B2
(45) Date of Patent: Mar. 2, 2021

(54) LIQUID POLYMERIZABLE COMPOSITION COMPRISING MINERAL NANOPARTICLES AND ITS USE TO MANUFACTURE AN OPTICAL ARTICLE

(71) Applicants: NIKON CORPORATION, Tokyo (JP); ESSILOR INTERNATIONAL (COMPAGNIE GENERALE D'OPTIQUE), Charenton le Pont (FR)

(72) Inventors: Mathieu Feuillade, Kawasaki (JP); Guillaume Cantagrel, Kawasaki (JP)

(73) Assignees: Nikon Corporation, Tokyo (JP); Essilor International, Charenton-le-Pont (FR)

(*) Notice: Subject to any disclaimer, the term of this patent is extended or adjusted under 35 U.S.C. 154(b) by 395 days.

(21) Appl. No.: 14/411,248

(22) PCT Filed: Jun. 26, 2013

(86) PCT No.: PCT/EP2013/063423
§ 371 (c)(1),
(2) Date: Dec. 24, 2014

(87) PCT Pub. No.: WO2014/001404
PCT Pub. Date: Jan. 3, 2014

(65) Prior Publication Data
US 2015/0203710 A1 Jul. 23, 2015

(30) Foreign Application Priority Data
Jun. 26, 2012 (WO) .................. PCT/IB2012/001382

(51) Int. Cl.
| | | |
|---|---|---|
| *C09D 143/02* | (2006.01) | |
| *C08G 75/12* | (2016.01) | |
| *C08G 75/045* | (2016.01) | |
| *C08F 230/02* | (2006.01) | |
| *C08F 130/02* | (2006.01) | |
| *C08F 30/02* | (2006.01) | |
| *C08K 3/22* | (2006.01) | |
| *C08K 9/04* | (2006.01) | |

(52) U.S. Cl.
CPC ............ *C09D 143/02* (2013.01); *C08F 30/02* (2013.01); *C08F 130/02* (2013.01); *C08F 230/02* (2013.01); *C08G 75/045* (2013.01); *C08G 75/12* (2013.01); *C08K 3/22* (2013.01); *C08K 9/04* (2013.01); *C08K 2003/2241* (2013.01); *C08K 2003/2244* (2013.01); *Y10T 428/31935* (2015.04)

(58) Field of Classification Search
CPC ...... C09D 143/02; C08F 30/02; C08F 130/02; C08F 230/02
See application file for complete search history.

(56) References Cited

U.S. PATENT DOCUMENTS

| | | | | |
|---|---|---|---|---|
| 3,957,918 A | * | 5/1976 | Dickie | .................. C08F 291/18 427/250 |
| 6,107,360 A | * | 8/2000 | Kaneko | ...................... C08F 2/44 106/733 |
| 2006/0128869 A1 | | 6/2006 | Taima | |
| 2008/0272347 A1 | * | 11/2008 | Fukuda | .................. C07F 9/5304 252/586 |
| 2009/0192288 A1 | * | 7/2009 | Nakamura | ........ C07F 9/655309 528/380 |
| 2009/0305013 A1 | * | 12/2009 | De Meyer | ................. B32B 7/02 428/212 |

FOREIGN PATENT DOCUMENTS

| | | |
|---|---|---|
| CN | 1 394 900 A | 5/2011 |
| CN | 102 061 079 A | 5/2011 |
| JP | 11 043556 A | 2/1999 |
| JP | 2002/105325 A | 4/2002 |
| JP | 2002105325 A * | 4/2002 |
| WO | 2006/027956 A1 | 3/2006 |

OTHER PUBLICATIONS

Lui C. et al.: "A Facile Route to ZnS-Polymer Nanocomposite Optical Materials with High Nanophase Content", Advanced Materials, vol. 18. 2006. pp. 1188-1192, XP002693841.
Database WPI Week 200624 Thomson Scientific, London, GB; AN 2006-231669 XP002693842, Matsumoto K: "Resin Composition for Optical Media", & WO 2006/027956 AI (Kaneka Corp) Mar. 16, 2006 (Mar. 16, 2006) abstract.
International Search Report, dated May 21, 2013, from corresponding PCT application.

* cited by examiner

*Primary Examiner* — Ling Siu Choi
*Assistant Examiner* — David L Miller
(74) *Attorney, Agent, or Firm* — Nixon & Vanderhye

(57) ABSTRACT

Disclosed is a liquid polymerizable composition including a phosphine oxide or a phosphine sulphide monomer composition with mineral nanoparticles homogeneously dispersed therein, as well as its use for the preparation of a transparent polymeric material having a high refractive index and its use in the optical field.

6 Claims, No Drawings

LIQUID POLYMERIZABLE COMPOSITION COMPRISING MINERAL NANOPARTICLES AND ITS USE TO MANUFACTURE AN OPTICAL ARTICLE

The present invention concerns a liquid polymerizable composition for the preparation of a transparent polymeric material having a high refractive index and its use in the optical field.

The liquid polymerizable composition of the present invention comprises a phosphine oxide or a phosphine sulphide monomer composition with mineral nanoparticles homogeneously dispersed therein, said mineral nanoparticles being chosen among ZnS, $ZrO_2$, $TiO_2$ or $BaTiO_3$.

In the last ten years, it has become more and more difficult to synthesize materials which have a refractive index higher than 1.6 as well as the other properties required in optical field (transparency i.e. high transmission with low haze level, mechanical properties like shock resistance and abrasion resistance, optical properties including no optic distortion and high contrast, heat resistance, small shrinkage, chemical resistance . . . ) from pure organic monomers.

One solution to overcome this problem is to introduce mineral nanoparticles into the monomer composition in order to increase its refractive index. Typically, nanoparticles having a refractive index from 2.1 to 3 may be chosen among $ZrO_2$, $TiO_2$, $BaTiO_3$ or ZnS. However, with classical monomers having a refractive index around 1.5-1.6 (such as methylmethacrylate or styrene), the amount of nanoparticles required to achieve a high refractive index can be above 50% w/w, which may lead to the aggregation of the nanoparticles and adversely affect the transparency of the resulting material. Furthermore, it renders the material very brittle. To ensure good dispersibility of the nanoparticles into the monomer composition, the nanoparticles may require to be coated with a capping agent (such as hexanoic acid, methacrylic acid or methacryloxy trimethoxysilane). However, the capping agent generally has a refractive index of not more than 1.5 thereby reducing the benefit produced by the nanoparticle itself regarding the refractive index.

Therefore, the difficulty lies in the selection of the right combination of monomer composition, nanoparticles and capping agent if required that will ensure 1) a good stability over time of nanoparticles in the monomer composition and 2) a good dispersability of the nanoparticles into the monomer composition while leading to a transparent material exhibiting an increased refractive index as well as other advantages such as mechanical properties like for example shock resistance and abrasion resistance. Furthermore, the polymerizable composition obtained after mixing the monomer, nanoparticles and capping agent if required should be compatible with the substrate or support on which it is coated, and therefore display good adhesion properties on said substrate or support.

Lü C. et al. (Advanced material, 2006, 18, 1188-1192) disclose a polymerizable composition comprising N,N-dimethylacrylamide (DMAA) wherein a high content of mercaptoethanol-capped ZnS nanoparticles are dispersed. However, the refractive index of the poly N,N-DMAA is low (n=1.511 as measured with Metricon 9010/M Prism coupler λ=594 nm, 4 mW.cm$^{-2}$ for 10 min, 3 wt % Irg 184.), which makes it difficult to produce a material with high refractive index.

The inventors have found a new polymerizable composition comprising a monomer having a phosphine oxide function (P=O) or phosphine sulphide function (P=S) whose structure results in a high refractive index, which is higher than the refractive index of poly N,N-DMAA, and wherein mineral nanoparticles such as ZnS $ZrO_2$, $TiO_2$ and $BaTiO_3$ can be homogeneously dispersed in order to increase the refractive index of the material.

In one embodiment, the nanoparticles are ZnS nanoparticles coated with one or more thiol-containing compounds which can reach higher refractive index than nanoparticles with typical capping agents. Furthermore, large amounts of such coated ZnS nanoparticles can be introduced into a phosphine oxide function or phosphine sulphide function containing-monomer composition with a very good dispersibility.

In another embodiment, the nanoparticles are $ZrO_2$, $TiO_2$ and $BaTiO_3$ nanoparticles which can be homogeneously dispersed in a phosphine oxide function or phosphine sulphide function containing-monomer composition without any capping agent.

The inventors have thus developed a polymerizable composition based on phosphine oxide monomers or phosphine sulphide monomers within which mineral nanoparticles are homogeneously dispersed. Said nanoparticles have the advantage that they can be added into the composition in large amounts (up to 50% w/w) with a very good dispersibility and stability. The presence of said nanoparticles into the composition allows increasing the refractive index of the material which can be obtained by curing said polymerizable composition. Said material is able to show excellent opticalproperties, such as a transmission higher than 80%, even higher than 90%.

Therefore, an object of the present invention is a liquid polymerizable composition comprising:

a liquid monomer composition containing:
a monomer of formula (I):

wherein:
X is an oxygen atom or a sulphur atom, preferably an oxygen atom,
at least one among R1, R2 and R3, identical or different, represents a polymerizable function which is directly linked to P or linked to P via a C1-C20 alkylene, one or several carbon atoms of which may be replaced with:
—O—, —S—, —NH— or —NR— wherein R is a C1-C10 alkyl group,
a divalent monocycloalkyl or bicycloalkyl comprising 5 to 9 carbon atoms, optionally substituted with 1 to 4 groups independently chosen among an halogen atom, C1-C6 alkyl, C1-C6 alkoxy, or C1-C6 alkylthio, or
a phenyl or naphtyl, optionally substituted with 1 to 4 groups independently chosen among an halogen atom, C1-C6 alkyl, C1-C6 alkoxy, or C1-C6 alkylthio,
and the other(s) among R1, R2 and R3, identical or different, represent(s) an hydrogen atom, a C1-C10alkoxy, C1-C10alkylthio, phenyl, aryloxy, arylthio, arylC1-C10alkyloxy, or aryl C1-C10alkylthio, or
a mixture of two different monomers M1 and M2 which are able to react together and form the monomer of formula (I), wherein M1 or M2 or both M1 and M2 contain the function P═X and M1 and M2 further contain functions which are able to react together to form a polymer, and mineral nanoparticles homogeneously dispersed in said monomer composition.

A polymerizable function is a chemical function enabling the monomer of formula (I) to form a solid polymer, for example by thermal and/or UV treatment.

Suitable polymerizable functions include vinyl, allyl, isocyanate, thioisocyanate, acrylate, thioacrylate, methacrylate, thiomethacrylate, ether, thioether, alcohol, epoxy, thiol, and episulfide.

Preferably, the polymerizable function is selected from the group consisting of acrylate, thioacrylate, methacrylate, thiomethacrylate, thiol, episulfide, or epoxy, more preferably among acrylate, methacrylate, thiol, or episulfide.

C1-C20 alkylene and C1-C6 alkylene respectively mean a linear or branched alkylene group comprising 1 to 20 carbon atoms and a linear or branched alkylene group comprising 1 to 6 carbon atoms, that may be substituted with —(CH$_2$)$_n$—R' wherein n is an integer from 0 to 5 and R' is an aryl, an aryloxy, an arylamine or an arylthio. Preferably, the C1-C20 alkylene is a C1-C6 alkylene, more preferably a C2-C4 alkylene, such as methylene, n-propylene or n-butylene.

C1-C6 alkyl and C1-C10 alkyl respectively mean a linear or branched alkyl group comprising from 1 to 6 carbon atoms and a linear or branched alkyl group comprising from 1 to 10 carbon atoms. Alkyl groups include for instance methyl, ethyl, n-propyl, isopropyl, n-butyl, isobutyl, pentyl, and hexyl.

C1-C6 alkoxy means a C1-C6 alkyl-O— group, wherein C1-C6 alkyl is defined as above. C1-C6 alkoxy groups include for instance methoxy or ethoxy.

C1-C6 alkylthio means C1-C6 alkyl-S— group, wherein C1-C6 alkyl is defined as above. C1-C6 alkylthio include for instance methylthio or ethylthio.

Monocycloalkyl and bicycloalkyl respectively mean a single non-aromatic ring and two fused non-aromatic rings, including saturated rings or partially saturated rings. Exemplary monocycloalkyl include cyclopentyl and cyclohexyl. Exemplary bicycloalkyl include norbornyl and adamantyl.

Halogen atom includes fluorine, chlorine, bromine or iodine atoms.

Aryloxy means a phenyl-O— group, wherein phenyl is optionally substituted by 1 to 3 groups chosen independently among C1-C6 alkyl, C1-C6 alkoxy, C1-C6 alkylthio or halogen atom, as defined above. Aryloxy include for instance phenoxy or methylphenoxy.

Arylthio means a phenyl-S— group, wherein phenyl is optionally substituted by 1 to 3 groups chosen independently among C1-C6 alkyl, C1-C6 alkoxy, C1-C6 alkylthio or halogen atom, as defined above. Arylthio includes for instance phenyl thio or methylphenylthio.

Arylamine means a phenyl-NH— group, wherein phenyl is optionally substituted by 1 to 3 groups chosen independently among C1-C6 alkyl, C1-C6 alkoxy, C1-C6 alkylthio or halogen atom, as defined above. Aryloxy include for instance phenoxy or methylphenoxy.

ArylC1-C10alkyloxy means the radical RR'—O— wherein R is a phenyl optionally substituted with 1 to 3 groups independently chosen among C1-C6 alkyl, C1-C6 alkoxy, C1-C6 alkylthio or halogen atom, as defined above, and R' is a C1-C10alkyl as defined above.

ArylC1-C10alkylthio means the radical RR'—S— wherein R is a phenyl optionally substituted with 1 to 3 groups independently chosen among C1-C6 alkyl, C1-C6 alkoxy, C1-C6 alkylthio or halogen atom and R' is a C1-C10alkyl as defined above.

In the monomer of formula (I), at least one among R1, R2 and R3 comprises a polymerizable function. Hence, the monomer of formula (I) may contain one, two or three polymerizable functions, identical or different, preferably identical.

In one embodiment, R1 and R2 are identical and both bear a polymerizable function, preferably the same polymerizable function.

In one particular embodiment, R1, R2 and R3 are identical and all bear a polymerizable function, preferably the same polymerizable function.

Preferably, R1, R2 and R3, identical or different, represent a polymerizable function which is directly linked to P or linked to P via a C1-C20 alkylene, one or several carbon atoms of which is replaced with —O—, —S— or —NR—, wherein R is a C1-C6 alkyl group.

Without wishing to be bound by any theory, in formula (I), the phosphine oxide function P═O or phosphine sulphide function P═S is believed to help in dispersing the nanoparticles, as well as to help in increasing the refractive index of the material which can be obtained by curing the polymerizable composition.

The nanoparticles are homogeneously dispersed in the monomer of formula (I) by solvation. Solvation involves different types of intermolecular interactions, such as hydrogen bonding, ion-dipole, dipole-dipole attractions or Van der Vaals forces.

In a preferred embodiment, the other(s) among R1, R2 and R3, identical or different, bearing no polymerizable function, comprises a high refractive index moiety, which helps in increasing the refractive index of the material which can be obtained by curing the polymerizable composition. Such a high refractive index moiety may be chosen from a phenyl, aryloxy, arylthio, arylC1-C10alkyloxy, or aryl C1-C10alkylthio, in particular arylC1-C6alkyloxy, or aryl C1-C6alkylthio.

Sulfur atoms and aromatic rings have a high polarizability and are easily deformed under the action of external field, which leads to a material having a high refractive index.

The high refractive index moiety may also be carried by R1, R2 or R3 bearing a polymerizable function. In that case, the high refractive index may be a phenyl or naphtyl, optionally substituted with 1 to 4 groups independently chosen among an halogen atom, C1-C6 alkyl, C1-C6 alkoxy, or C1-C6 alkylthio.

In one embodiment, the monomer is a phosphine oxide monomer of formula (Ia):

(Ia)

wherein:
at least one among R$_1$a, R$_2$a and R$_3$a, identical or different, represents:
—(R4)$_n$—X—(R5—Y)$_m$—(R6)$_p$-Q wherein:
R4, R5 and R6, identical or different, represent a C1-C6 alkylene group, one or several carbon atoms of which may be replaced with a phenylene group,
X and Y, identical or different, represent O, S, or —NR—, wherein R is a C1-C6 alkyl group, n, m and p, identical or different, represent an integer from 0 to 4, preferably from 0 to 2, more preferably 0 or 1, Q represents a polymerizable function, preferably chosen from acrylate, methacrylate, episulfide, or thiol, and the other(s) among $R_1a$, $R_2a$ and $R_3a$, identical or different, represent(s) an hydrogen atom, a phenyl, an C1-C6alkoxy, C1-C6alkylthio, aryloxy, arylthio, aryl C1-C6alkoxy, or aryl C1-C6alkylthio.

Preferably, R4, R5 and R6, identical or different, represent a C1-C2 alkylene.

In one embodiment, n and m are 0, p is 1, R6 is —C2H4—, X is O, S or —NR—, wherein R is a C1-C6 alkyl group and Q is chosen from acrylate or methacrylate.

In one embodiment, $R_{1a}$ and $R_{2a}$ are identical and both bear a polymerizable function, preferably the same polymerizable function.

In one particular embodiment, $R_{1a}$, $R_{2a}$ and $R_{3a}$ are identical and all bear a polymerizable function, preferably the same polymerizable function.

In a preferred embodiment, the other(s) among $R_{1a}$, $R_{2a}$ and $R_{3a}$, bearing no polymerizable function, identical or different, comprises a high refractive index moiety, which helps in increasing the refractive index of the material which can be obtained by curing the polymerizable composition. Such a high refractive index moiety may be chosen from a phenyl, aryloxy, arylthio, arylC1-C10alkyloxy, or aryl C1-C10alkylthio, in particular arylC1-C6alkyloxy, or aryl C1-C6alkylthio.

In one embodiment, the monomer is a phosphine oxide monomer of formula (Ib):

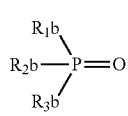

(Ib)

wherein:
at least one among $R_1b$, $R_2b$ and $R_3b$, identical or different, represents:
—(CHR')$_n$—X—(CHR'')$_m$-Q wherein:
X represent O, S, or —NR—, wherein R is a C1-C6 alkyl group,
n and m, identical or different, represent an integer from 0 to 4, preferably 0, 1 or 2,
R' and R'', identical or different, represent a hydrogen atom, a C1-C6alkyl, a phenyl, arylthio or arylthio-CH$_2$—,
Q represents a polymerizable function, preferably chosen from acrylate, methacrylate, episulfide, thiol or thioacrylate,
and the other(s) among $R_1b$, $R_2b$ and $R_3b$, identical or different, represent(s) an hydrogen atom, a phenyl, an C1-C6alkoxy, C1-C6alkylthio, aryloxy, arylthio, arylC1-C6alkoxy, or arylC1-C6alkylthio.

In one embodiment, $R_{1b}$ and $R_{2b}$ are identical and both bear a polymerizable function, preferably the same polymerizable function.

In one particular embodiment, $R_{1b}$, $R_{2b}$ and $R_{3b}$ are identical and all bear a polymerizable function, preferably the same polymerizable function.

In a preferred embodiment, the other(s) among $R_{1b}$, $R_{2b}$ and $R_{3b}$, bearing no polymerizable function, identical or different, comprises a high refractive index moiety, which helps in increasing the refractive index of the material which can be obtained by curing the polymerizable composition. Such a high refractive index moiety may be chosen from a phenyl, aryloxy, arylthio, arylC1-C10alkyloxy, or aryl C1-C10alkylthio, in particular arylC1-C6alkyloxy, or aryl C1-C6alkylthio.

Monomers of formula (Ia) or (Ib) include the following compounds:

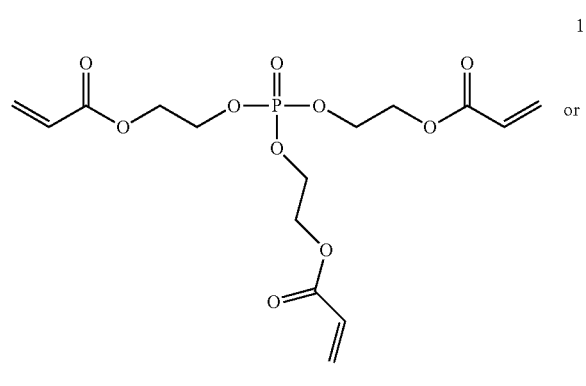

3-PA

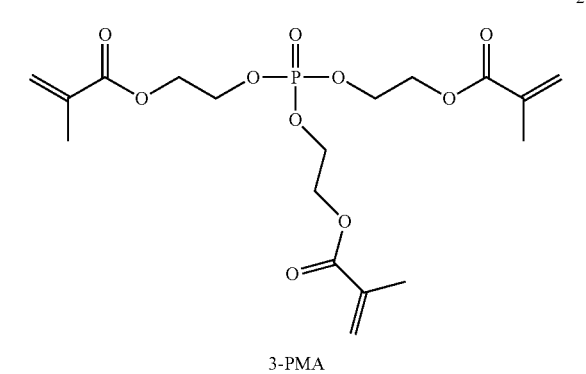

3-PMA

Monomers of formula (Ia) or (Ib) also include the following compounds:

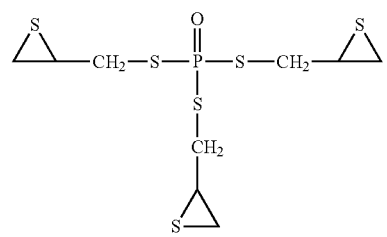

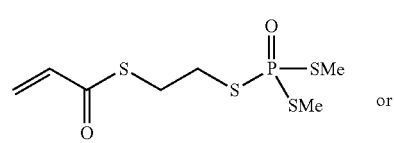

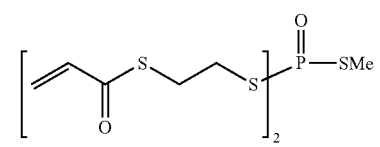

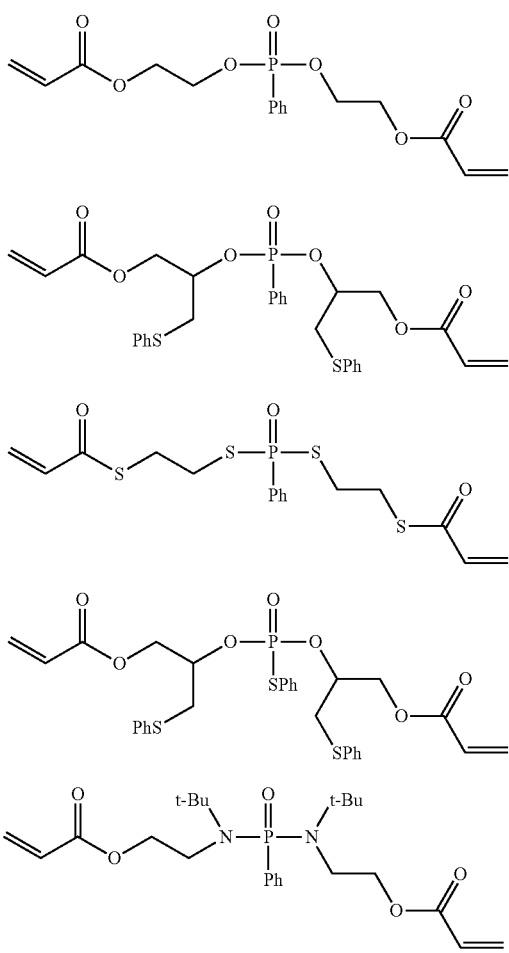

The monomer of formula (I) may be synthetized via a nucleophilic addition reaction by reacting a halide compound containing a P=O or a P=S function with a nucleophilic compound, such as an organometallic compound, a hydroxyl compound, a thiol compound or a secondary amine compound, for instance as disclosed in US 2009/0192288, JP 05-320181 or JP 04-330083.

For instance, acrylate or methacrylate monomers (4) and (5) bearing a phosphine oxide function may be synthetized by a nucleophilic addition of a compound H—XR of formula (1) which is a thiol (X=S), an alcohol (X=O) or a secondary amine (X=N-alkyl), wherein R is an alkyl or an aryl bearing an acrylate or methacrylate function, respectively on a phenyl phosphonic dichloride (2) and a phosphoric trichloride (3) as represented below in scheme 1:

Scheme 1

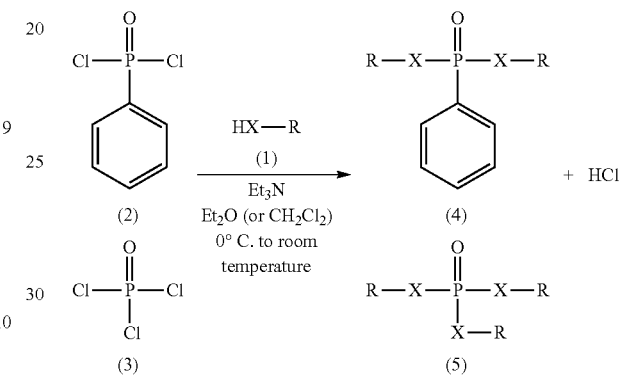

In table 1, some examples of nucleophilic compounds HX—R (X=O, S, N-alkyl) that can be used and the corresponding acrylate monomers, are listed. The corresponding methacrylate precursors may be used for synthetizing the corresponding methacrylate monomers.

TABLE 1

| HX—R | Precursors | Monomers | Simulated Refractive Index |
|---|---|---|---|
| X = O | Cl—P(=O)(Ph)—Cl + HO—CH2CH2—O—C(=O)—CH=CH2 | CH2=CH—C(=O)—O—CH2CH2—O—P(=O)(Ph)—O—CH2CH2—O—C(=O)—CH=CH2 | n = 1.51 |
|  | Cl—P(=O)(Ph)—Cl + CH2=CH—C(=O)—O—CH2—CH(OH)—CH2—SPh | CH2=CH—C(=O)—O—CH2—CH(—O—P(=O)(Ph)—O—CH(CH2—SPh)—CH2—O—C(=O)—CH=CH2)—CH2—SPh | n = 1.60 |
| X = S | Cl—P(=O)(Ph)—Cl + HS—CH2CH2—S—C(=O)—CH=CH2 | CH2=CH—C(=O)—S—CH2CH2—S—P(=O)(Ph)—S—CH2CH2—S—C(=O)—CH=CH2 | n = 1.61 |

TABLE 1-continued

| HX—R | Precursors | Monomers | Simulated Refractive Index |
|---|---|---|---|
| X = O and S | 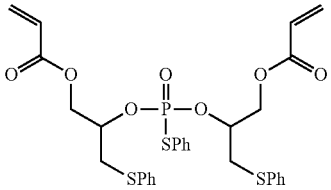 | 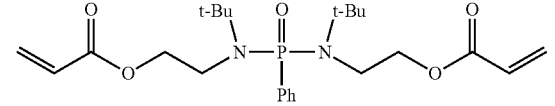 [SMILES: C=CC(=O)OCCN(C(C)(C)C)P(=O)(c1ccccc1)N(CCOC(=O)C=C)C(C)(C)C] | n = 1.62 |
| X = NR | 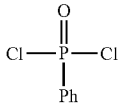 | 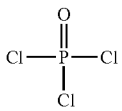 | n = 1.52 |

Refractive indexes indicated in Table 1 were simulated by using ChemSketch software.

The precursor commercial availability or references for synthesis are indicated in table 2a.

TABLE 2a

| Precursors | CAS | Company/reference |
|---|---|---|
| 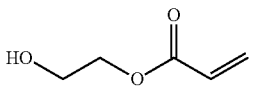 | 824-72-6 | Aldrich |
| 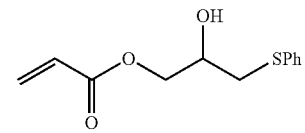 | 10025-87-3 | Aldrich |
| 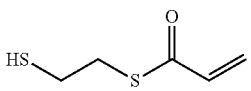 | 818-61-1 | TCI |
| 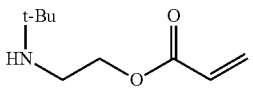 | 1159203-53-8 | Repub. Korean Kongkae Taeho Kongbo (2009), KR 2009045836 A 20090508 |
| HS⌒S⌒(C=O)⌒ | 52135-50-9 | U.S.S.R (1974), SU 246511 A1 19740325 |
| t-Bu-HN⌒O⌒(C=O)⌒ | 14206-21-4 | Journal of Organic Chemistry (1957), 22, 787-9. |
| PhSH | 108-98-5 | Aldrich |

The synthesis as described above can be extended to organometallic nucleophiles. One of the synthetic pathways is shown below in scheme 2. First Grignard reagent is prepared by oxidative addition of Mg into the carbon-halogen bond of a compound R—X (6) wherein R is alkyl or aryl and X is an halogen, then after nucleophilic addition of this organometallic compound onto the halide, the corresponding phosphine oxide (7) or (8) is obtained.

Scheme 2

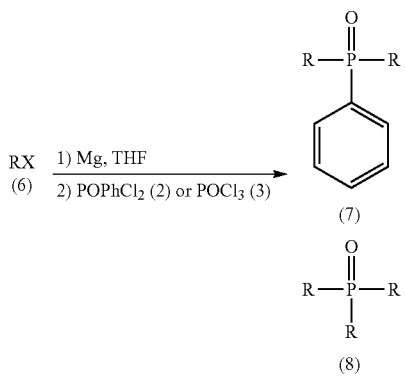

Since organometallic reagents are very reactive, the polymerizable unit should be added after the nucleophilic addition.

In the following example (scheme 3), bromo-1-propanol is chosen as the starting material. In a first step the alcohol is protected as a silyl ether 2 by treatment with tert-butyldimethyl silyl chloride in the presence of triethylamine. Then Grignard reagent 3 is formed by additive oxidation of magnesium into the carbon-bromide bond (if this step is difficult, organometallic specie can be made by halogen-metal exchange by treatment with t-BuLi for example). Condensation of 3 with phenyl phosphonic dichloride gives compound 4. After deprotection of silyl ethers under acidic treatment (Journal of Organic Chemistry, 68 (19), 7249-7253, 2003), regular acrylation reaction gives target compound 5.

Phosphine sulphides may be synthetized by similar routes, for instance from the precursors indicated in table 2b:

TABLE 2b

| Precursors | CAS | Company |
|---|---|---|
| Thiophosphoryl chloride | 3982-91-0 | Aldrich |
| Phenylphosphonothioic dichloride | | Aldrich |

Treatment of 4 with H₂S should also give the corresponding phosphine sulphide.

Similar routes may be used to synthetize monomers with other polymerizable functions, such as alcohol, thiol or epoxy function. For instance, a thiol function may be added to the monomer by treatment of an halide with NaSH through nucleophilic substitution. An epoxy can be added to the monomer by condensing glycidol with a phosphoryl chloride compound. An alcohol function may be added to the monomer after deprotection of di-silylether functions (of compound 4 for instance) under acidic conditions to form a diol.

Compounds of formula (I) wherein R1≠R2≠R3 may be synthesized according to the above mentioned routes, in mixture with the corresponding compounds wherein R1=R2 or R1=R2=R3, then be isolated according to techniques well known by the person skilled in the art.

The liquid monomer composition may also comprise a mixture of two different monomers M1 and M2 which are able to react together and form the monomer of formula (I), wherein M1 or M2 or both M1 and M2 contain a phosphine oxide or sulphide oxide function P=X and M1 and M2 further contain functions which are able to react together to Scheme 3

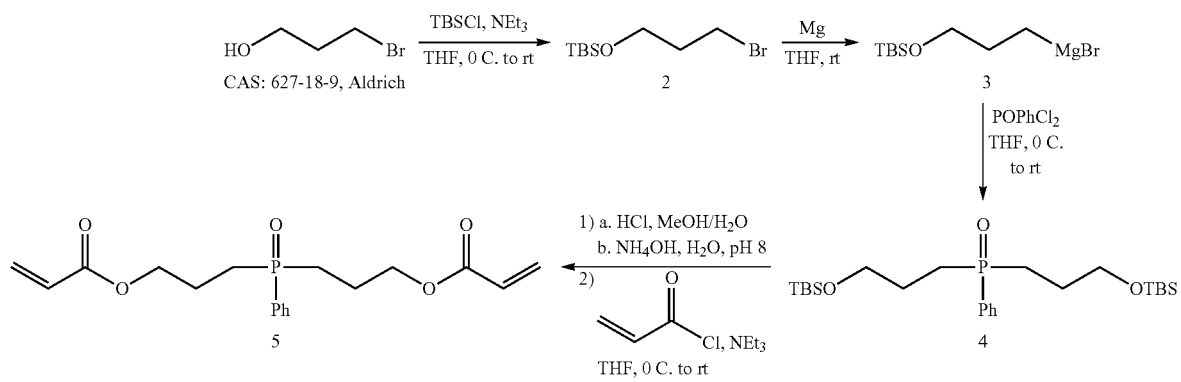

TBS = tert-butyl dimethyl silyl form a polymer, such as isocyanate/alcohol, thiocyanate/acohol, ene/thiol or thiol/episulfide.

Some monomers of formula (I) may be commercially available, such as 3PA (tris(2-acryloyloxyethyl)phosphate, CAS: 35057-49-9, marketed by Osaka Organic Chemicals under the commercial name Viscoat 3PA®) and 3PMA (tris(2-methacryloyloxyethyl)phosphate, CAS: 15458-75-0, marketed by Osaka Organic Chemicals under the commercial name Viscoat 3PMA®).

The liquid polymerizable composition of the invention may comprise only one monomer of formula (I) or a mixture of monomers of formula (I). If the monomer of formula (I) is solid, it may be solubilized in another monomer of formula (I) which is liquid in order to form a liquid polymerizable composition.

According to the invention, the mineral nanoparticles are homogeneously dispersed in the monomer of formula (I), i.e. do not form aggregates having a size higher than 100 nm, as measured by transmission electronical microscopy. A homogeneous dispersion of nanoparticles allows obtaining a composite material whose haze after curing is below 5% as measured according to Japanese Industrial Standard No. K 7136-2000. Furthermore, the material composite is transparent.

The mineral nanoparticles may be chosen among ZnS, $ZrO_2$, $TiO_2$ or $BaTiO_3$.

The nanoparticles can be synthetized according to methods well known by the person skilled in the art, or be commercially available in the form of powder or a suspension in a solvent, such as methanol.

For instance, TiO2 nanoparticles in suspension in methanol with a particle size of 60 nm are marketed by Sakai chemical under the commercial name SRD-2M.

For instance, ZrO2 nanoparticles in suspension in methanol with a particle size of 35 nm are marketed by Sakai chemical under the commercial name SZR-M.

For instance, $BaTiO_3$ nanoparticles in the form of powder (cubic crystalline phase) with a particle size of less than 100 nm (BET) are marketed by Aldrich under the commercial name Barium Titanate (IV) (No. Cas: 12047-27-7).

According to the invention, the "particle size" is the diameter of the highest population of particles as measured with dynamic light scattering (DLS).

The particle size of the mineral nanoparticles is preferably less than 50 nm, more preferably between 30 and 5 nm. This size range allows limiting haze in the final polymerized material. It can be measured by dynamic light scattering (DLS), for instance by using Horiba SZ-100 size measurement instrument.

The nanoparticles of ZnS are preferably coated with one or more thiol-containing compounds. Preferentially, nanoparticles of ZnS are coated with mercaptoethanol, thiophenol, mercaptophenol, or a mixture thereof.

Typically, the refractive index of the nanoparticles is as follows:

ZnS, sphalerite, cubic, n(589 nm)=2.3691 (Landolt-Bornstein Numerical Data and Functional Relationships in Science and Technology, III/30A, High Frequency Properties of Dielectric—Crystals. Piezooptic and Electrooptic Constants, Springer-Verlag, Berlin 1996);

BaTiO3, tetragonal, ordinary ray: n(589 nm)=2.4405 (Shannon, R. D., Shannon, R. C., Medenbach, O., and Fischer, R. X., "Refractive Index and Dispersion of Fluorides and Oxides", J. Phys. Chem. Ref. Data 31, 931, 2002.);

TiO2, rutile, tetragonal, ordinary ray: n(589 nm)=2.562 (Shannon, R. D., Shannon, R. C., Medenbach, O., and Fischer, R. X., "Refractive Index and Dispersion of Fluorides and Oxides", J. Phys. Chem. Ref. Data 31, 931, 2002.);

ZrO2, tetragonal, ordinary ray: n(589 nm)=2.20 (Polymer Journal, 2008, 40, 1157-1163);

The particle size of the ZnS nanoparticles is less than 10 nm, preferably between 3 and 6 nm. This size range allows limiting haze in the final polymerized material.

Methods for preparing ZnS nanoparticles with capping agent(s), such as thiol-containing compound(s), are well known to the person skilled in the art.

For instance, $Zn(OAc)_2$ (a Zn source), the capping agent(s) and thiourea (a sulphur source) are dissolved in a solvent, such as DMF (dimethylformaldehyde), N,N Dimethylacetamide, or DMSO (dimethylsulfoxide) (for instance 2.5 g of $Zn(OAc)_2$ in 30 ml of DMF). The glassware set-up is purged with nitrogen during 10 minutes in order to prevent the formation of ZnO and reduce the amount of water. Then the solution is heated under reflux. At the end of the heating process, a transparent solution is obtained. A solvent such as ethanol, acetone, acetonitrile, toluene or water, is added to the solution to induce precipitation of the coated ZnS nanoparticles, depending on the particles properties. The precipitation allows the separation of the particles from the solvent and the capping agent which has not reacted. The solvent is chosen depending on the coupling agent. Typically, when thiophenol is used as a coupling agent, water is used to precipitate the coated particles. Particles may be separated from the solution by centrifugation and washed with methanol, acetonitrile or toluene. See for instance the method described in Changli Lü, Yuanrong Cheng, Yifei Liu, Feng Liu, and Bai Yang ("A Facile Route to ZnS-Polymer Nanocomposite Optical Materials with High Nanophase Content via Gamma-Ray Irradiation Initiated Bulk Polymerization", Adv. Mater., 2006, 18, 1188-1192.).

The above method advantageously allows the dispersion of the nanoparticle in powder form in the monomer composition, as opposed to other methods which require the dispersion of the nanoparticles into a solvent before the introduction into the monomer composition.

Suitable thiol-containing compounds include small molecules, such as those having a molar mass lower than 250 g/mol, containing one thiol function and having a high refractive index higher than 1.5 (at 594 nm).

The thiol-containing compound of the invention is preferably chosen among mercaptoethanol, thiophenol, mercaptophenol, or a mixture thereof.

When preparing the coated nanoparticles of ZnS, the relative molar amounts of the Zn source, the thiol-containing compound and the S source is chosen so that during the process of preparation, no self precipitation occurs. Typically, the molar ratio of the thiol-containing compound over Zn is comprised between 0.5 and 3, preferably between 0.8 and 2. The molar ratio is number of moles of thiol-containing compound for one mole of zinc acetate.

Preferably, the nanoparticles of ZnS are coated with a mixture of mercaptoethanol (ME) and thiophenol (PhS). The molar ratio of ME and PhS over Zn is comprised between 2.0 and 0.1, more preferably between 0.4 and 0.2. When the ZnS nanoparticles are coated with only with ME, the molar ratio of ME over Zn is comprised between 1.3 and 1.6.

The nanoparticles of ZnS have a crystal size comprised between 3 and 10 nm, more preferably between 3 and 6 nm. The crystal size can be determined by XR diffraction according to the Williamson-Hall method.

The nanoparticles of ZnS coated with said thiol-containing compound(s) have a particle size of comprised between 4 and 80 nm. The particle size of the coated nanoparticles can be determined by measurement with a Dynamic Light Scattering instrument (SZ-100 from Horiba) and correspond to size of highest population determined with this tool.

The amount of the mineral nanoparticles (coated if required or uncoated if not required) in the polymerizable composition is comprised between 5 and 50% w/w, preferably between 10 and 40% w/w, more preferably between 30 and 35% w/w based on the total weight of the liquid polymerizable composition.

The liquid polymerizable composition of the invention may comprise other ingredients typically used in polymerizable compositions, such as a mold release agent, photostabilizer, antioxidant, dye anti-coloring agent, fillers, UV light absorber or optical brightener.

Another object of the present invention is an optical substrate coated with the liquid polymerizable composition as previously defined.

In this invention "coating" or "coat" should be construed to cover not only regular coatings but also a resin layer having aspherical shape provided on a spheric or aspheric glass lens to obtain aspheric effect. The typical such resin layer is disclosed in U.S. Pat. No. 7,070,862.

The optical substrate may be any organic glass commonly known and used in the optical field. It may be a thermoplastic resin such as a thermoplastic polycarbonate, or a thermoset or photo-cured resin such as CR®, polyurethane or polythiourethane.

The thickness of the liquid polymerizable coating can be comprised between 1 μm and 1 mm.

Another object of the present invention is an optical article comprising:

(a) an optical substrate, and (b) a coating obtained by thermal and/or UV curing of the liquid polymerizable composition as previously defined.

Another object of the present invention is to cure the liquid polymerizable as bulk material for optical article. The thickness of cured liquid polymerizable as bulk material can be comprised between 1 mm and 2 cm.

The optical article is preferably an optical lens, such as an ophthalmic lens, sunglass lens or other optical lens for optical instrument, and most preferably an ophthalmic lens. It may contain functional layers such as polarizing layers, anti-reflecting coatings, visible light and UV absorbing coatings, anti-shock coatings, abrasion-resistant-coating, anti-smudge-coating, anti-fog coating, anti-dust coating, photochromic coatings, all of which are familiar to the skilled person.

The liquid polymerizable composition coating may be applied onto the optical substrate by any suitable coating method such as dip-coating, bar coating, spray coating, or spin coating.

The curing of the resulting layer is done by subjecting the coated substrate to UV light and/or heat. The refractive index of the cured layer can be increased between 0.01 and 0.15 for example.

Another object of the present invention is the use of mineral nanoparticles having a refractive index which is higher than the refractive index of the monomer of formula (I), preferably higher than 2, for increasing the refractive index of a polymeric material obtained by thermal and/or UV curing of a liquid monomer composition containing:

a liquid monomer composition containing:
a monomer of formula (I):

wherein:
X is an oxygen atom or a sulphur atom, preferably an oxygen atom,
at least one among R1, R2 and R3, identical or different, represents a polymerizable function which is directly linked to P or linked to P via a C1-C20 alkylene, one or several carbon atoms of which may be replaced with:
—O—, —S—, —NH— or —NR— wherein R is a C1-C10 alkyl group,
a divalent monocycloalkyl or bicycloalkyl comprising 5 to 9 carbon atoms, optionally substituted with 1 to 4 groups independently chosen among an halogen atom, C1-C6 alkyl, C1-C6 alkoxy, or C1-C6 alkylthio, or
a phenyl or naphtyl, optionally substituted with 1 to 4 groups independently chosen among an halogen atom, C1-C6 alkyl, C1-C6 alkoxy, or C1-C6 alkylthio,
and the other(s) among R1, R2 and R3, identical or different, represent(s) an hydrogen atom, a C1-C10alkoxy, C1-C10alkylthio, phenyl, aryloxy, arylthio, arylC1-C10alkyloxy, or aryl C1-C10alkylthio, or
a mixture of two different monomers M1 and M2 which are able to react together and form the monomer of formula (I), wherein M1 or M2 or both M1 and M2 contain the function P=X and M1 and M2 further contain functions which are able to react together to form a polymer, and
wherein said mineral nanoparticles are homogeneously dispersed in said monomer composition.

In one embodiment, said use of mineral nanoparticles is for increasing the refractive index of a polymeric material obtained by thermal and/or UV curing of a phosphine oxide monomer of formula (Ia):

wherein:
at least one among $R_1a$, $R_2a$ and $R_3a$, identical or different, represents:
—(R4)$_n$—X—(R5—Y)$_m$—(R6)$_p$-Q wherein:
R4, R5 and R6, identical or different, represent a C1-C6 alkylene group, one or several carbon atoms of which may be replaced with a phenylene group,
X and Y, identical or different, represent O, S, or —NR—, wherein R is a C1-C6 alkyl group,
n, m and p, identical or different, represent an integer from 0 to 4, preferably from 0 to 2, more preferably 0 or 1,
Q represents a polymerizable function, preferably chosen from acrylate, methacrylate, episulfide, or thiol,
and the other(s) among $R_1a$, $R_2a$ and $R_3a$, identical or different, represent(s) an hydrogen atom, a phenyl, an C1-C6alkoxy, C1-C6alkylthio, aryloxy, arylthio, aryl C1-C6alkoxy, or aryl C1-C6alkylthio.

In one particular embodiment, said use of mineral nanoparticles is for increasing the refractive index of a polymeric material obtained by thermal and/or UV curing of a phosphine oxide monomer of formula (Ib):

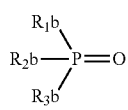

(Ib)

wherein:
- at least one among $R_1b$, $R_2b$ and $R_3b$, identical or different, represents:
  —$(CHR')_n$—X—$(CHR'')_m$-Q wherein:
  X represent O, S, or —NR—, wherein R is a C1-C6 alkyl group,
  n and m, identical or different, represent an integer from 0 to 4, preferably 0, 1 or 2,
  R' and R'', identical or different, represent a hydrogen atom, a C1-C6alkyl, a phenyl, arylthio or arylthio-$CH_2$—,
  Q represents a polymerizable function, preferably chosen from acrylate, methacrylate, episulfide, thiol or thioacrylate,
- and the other(s) among $R_1b$, $R_2b$ and $R_3b$, identical or different, represent(s) an hydrogen atom, a phenyl, an C1-C6alkoxy, C1-C6alkylthio, aryloxy, arylthio, arylC1-C6alkoxy, or arylC1-C6alkylthio.

Preferably, the mineral nanoparticles are chosen among ZnS, $ZrO_2$, $TiO_2$ or $BaTiO_3$.

The invention will now be further described in the following examples. These examples are offered to illustrate the invention and should in no way be viewed as limiting the invention.

EXAMPLES

1) Preparation of ZnS Nanoparticles Coated with a Thiol-Containing Compound.

$Zn(OAc)_2$, the capping agent and thiourea (TUA) are dissolved in DMF. The glassware set-up is purge with nitrogen during 10 min. Then the solution is heated under reflux at 160° C. under small nitrogen flow. At the end of the heating process, a transparent solution is obtained. The solution is poured in methanol, acetonitrile or water to induce the precipitation of the ZnS nanoparticles. Nanoparticles of ZnS are separated from the solution by centrifugation and washed with methanol or acetonitrile twice. The powder is dryed under vacuum for 10 hours.

The capping agents used in this set of experiments are mercaptoethanol (ME) (60-24-2), thiophenol (PhS) (108-98-5), and mercaptophenol (MPhO) (637-89-8).

The relative molar amounts of $Zn(OAc)_2$, the capping agent and thiourea are indicated in table 3.

The amount of capping agent is chosen so that during reflux and after cooling of the mixture, no self-precipitation occurs. Examples of relative molar amounts leading to a stable dispersion are indicated in table 3. A mixture of 2 different capping agents allows the use of a lower amounts of capping agent.

TABLE 3

| Compound | Relative molar amounts | | | |
| --- | --- | --- | --- | --- |
| | Experiment 1 | Experiment 2 | Experiment 3 | Experiment 4 |
| ME | 2.18 | 0.6 | 0.44 | 0 |
| PhS | 0 | 0.3 | 0.44 | 0 |
| MPhO | 0 | 0 | 0 | 2.78 |
| Zn(OAc)2 | 1 | 1 | 1 | 1 |
| TUA | 1.65 | 1.65 | 1.65 | 1.65 |

An XRD analysis was performed on the powder of ZnS-ME from experiment 1. The results show that the ZnS particles have a sphalerite structure.

The mean crystal size of the ZnS nanoparticles (without coating) was determined according to the Williamson-Hall method. The mean crystal size of the ZnS nanoparticles was evaluated at 3.58 nm with a relative dispersion of 4.5% (measured by XR diffraction).

The particle size of the coated ZnS nanoparticles obtained from experiment 3 was measured using Horiba SZ-100 size measurement instrument after cooling of the dispersion in DMF.

The results show a particle size of around 7 nm with a narrow distribution size going from 4 to 14 nm. This small particle size and narrow distribution size allow the limitation of light scattering in the final composite.

2) Preparation of Liquid Polymerizable Composition Comprising ZnS Nanoparticles Coated with a Thiol-Containing Compound Dispersed in a Phosphine Oxide Containing Monomer.

ZnS nanoparticles coated with PhS, ME and/or MPhO were introduced into the following phosphine oxide monomer 1 and 2 (marketed by Osaka Organic Chemicals respectively under the commercial name Viscoat 3-PA® and 3-PMA®) at 60° C. under ultrasonic waves. Table 4 gives the maximum amount of particles that can be homogeneously dispersed in the monomers 1 and 2.

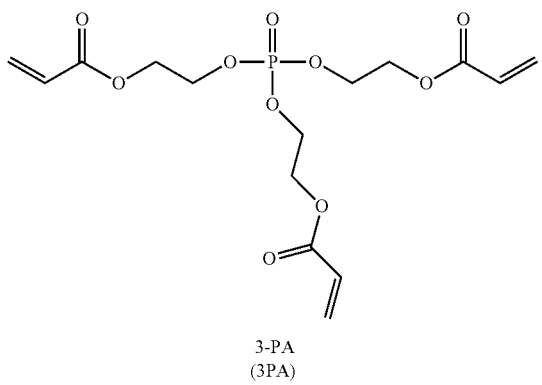

3-PA
(3PA)

1

-continued

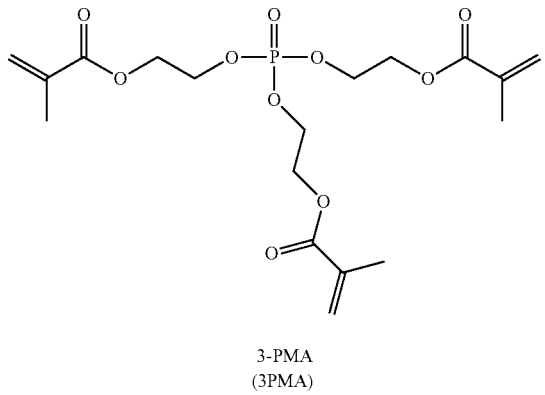

3-PMA
(3PMA)

TABLE 4

| Molar amount of the capping agent relative to ZnS | | | | |
|---|---|---|---|---|
| PhS | ME | MPhO | 3PA | 3PMA |
| 0.3 | 0.6 | — | Up to 20 wt % | N/A |
| 0.88 | — | — | Up to 20 wt % | Up to 20 wt % |
| — | 2.18 | — | 6 wt % | 4 wt % |
| — | — | 2.78 | Up to 17 wt % | N/A |

The data of table 4 shows that ZnS particles capped with MPhO, PhS, Me or a mixture of PhS and Me can be homogeneously dispersed in relatively high amounts (up to 20 wt %) in 3PA or 3PMA monomer composition.

The polymerizable composition was applied between two glass plates separated by a spacer of 200 µm. Photopolymerization was performed after addition of a radical photoinitiator (Irgacure184, BASF) and illumination with a Hg lamp during 10 min (4 mW.cm$^{-2}$). Photopolymerization was induced between two glass substrates to avoid the inhibition by oxygen. A Teflon spacer of 200 µm was used between the two glass substrates. The resulting thickness of the cured material was 220 µm.

Haze was measured after demolding with a spectrophotometer UV-Vis (Hitachi U-4100) according to Japanese Industrial Standard No 7136-2000.

The refractive index (n) of the cured material was measured after demolding using a Metricon 2010M (prism coupling method). The results are indicated in table 5.

TABLE 5

| | Wavelength | Refractive index of 3PA (180 µm) | Refractive index of 3PA + coated particles ZnS (220 µm) [20 wt % of particles] | δ n |
|---|---|---|---|---|
| ZnS PhS ME 0.3:0.6 | 654 nm | 1.505 | 1.551 | 0.046 |
| | 594 nm | 1.508 | 1.554 | 0.046 |
| | 473 nm | 1.516 | 1.566 | 0.05 |
| | Abbe number | 52 | 41 | |
| | T (400 nm) | 86% | 80% | |
| | Haze | | | |
| | 392 nm | 0.31% | 4.5% | |
| | 436 nm | 0.27% | 4.2% | |

TABLE 5-continued

| Wavelength | Refractive index of 3PA (180 µm) | Refractive index of 3PA + coated particles ZnS (220 µm) [20 wt % of particles] | δ n |
|---|---|---|---|
| 544 nm | 0.25% | 4.0% | |
| 653 nm | 0.25% | 3.8% | |

The data of table 5 shows that the refractive index of the polymer containing 20 wt % of coated ZnS particles is increased by 0.05 at 473 nm compared with the same polymer without particles.

Furthermore, the data of table 5 shows that the composite material is suitable for optical materials (haze below 5%).

3) Preparation of Liquid Polymerizable Composition Comprising ZrO2 Nanoparticles Dispersed in a Phosphine Oxide Containing Monomer.

Five compositions were prepared by adding to the phosphine oxide monomer 1 (marketed by Osaka Organic Chemicals under the commercial name Viscoat 3-PA®) respectively 10 wt %, 20 wt %, 30 wt %, 40 wt % and 50 wt % of $ZrO_2$ from a suspension of $ZrO_2$/MeOH (30 wt % in MeOH, commercially available from Sakai chemical), and then adding to this mixture 3 wt % of Irgacure 184 (a radical photoinitiator marketed by BASF). The methanol of the resulting composition was evaporated under reduced pressure.

Then, each composition was applied between two glass plates separated by a spacer of 500 µm. Photopolymerization was performed by illumination with a Hg lamp during 10 min (4 mW.cm$^{-2}$). Photopolymerization was induced between two glass substrates to avoid the inhibition by oxygen. A Silicon spacer of 500 µm was used between the two glass substrates.

The refractive index and Haze were measured as for example 2.

The refractive indexes at 594 nm, Abbe numbers and haze of the resulting materials are indicated in Table 6.

TABLE 6

| Optical properties | 0 wt % | 10 wt % | 20 wt % | 30 wt % | 40 wt % | 50 wt % |
|---|---|---|---|---|---|---|
| 594 nm | 1.506 | 1.520 | 1.539 | 1.555 | 1.569 | 1.592 |
| δn | — | 0.014 | 0.033 | 0.049 | 0.063 | 0.086 |
| Abbe Number | 57 | 51 | 48 | 52 | 46 | 45 |
| T (400 nm) | 86% | 85% | 75% | 75% | 71% | 77% |
| Haze | 0 wt % | 10 wt % | 20 wt % | 30 wt % | 40 wt % | 50 wt % |
| 392 nm | 0.31% | 0.95% | 1.3% | 1.3% | 2.1% | 3.8% |
| 436 nm | 0.27% | 0.86% | 1.2% | 1.2% | 1.9% | 3.5% |
| 544 nm | 0.25% | 0.75% | 1.0% | 1.0% | 1.5% | 3.1% |
| 653 nm | 0.25% | 0.70% | 0.92% | 0.94% | 1.3% | 2.8% |

The data of table 6 shows that the refractive index of the polymer may be increased by 0.086 at 594 nm with the addition of 50 wt % of $ZrO_2$ nanoparticles compared with the same polymer without nanoparticles.

Furthermore, the data of table 6 shows that the composite material is suitable for optical materials (haze below 5%).

In table 7 below, materials obtained according to the above described method from a composition containing 3-PA and 20 wt % of ZrO2 nanoparticles or 20 wt % of Zns nanoparticles coated with 0.3:0.6 PhS:ME are compared.

TABLE 7

| Optical properties | 3-PA | 20 wt % coated ZnS | 20 wt % ZrO2 |
|---|---|---|---|
| thickness | 500 μm | 220 μm | 500 μm |
| 594 nm | 1.506 | 1.554 | 1.539 |
| δn | — | 0.046 | 0.033 |
| Abbe Number | 57 | 41 | 48 |
| T (400 nm) | 91% | 80% | 75% |
| Haze | 3-PA | 20 wt % coated ZnS | 20 wt % ZrO2 |
| Thickness | 500 μm | 220 μm | 500 μm |
| 392 nm | 0.31% | 4.5% | 1.3% |
| 436 nm | 0.27% | 4.2% | 1.2% |
| 544 nm | 0.25% | 4.0% | 1.0% |
| 653 nm | 0.25% | 3.8% | 0.92% |

The data of table 7 shows that the increase of the refractive index of the polymer is higher with ZnS nanoparticles than with ZrO$_2$ nanoparticles.

4) Preparation of Liquid Polymerizable Composition Comprising TiO$_2$ Nanoparticles Dispersed in a Phosphine Oxide Containing Monomer.

Three compositions were prepared by adding to the phosphine oxide monomer 1 (marketed by Osaka Organic Chemicals under the commercial name Viscoat 3-PA®) respectively 10 wt %, 20 wt % and 30 wt % of TiO$_2$ from a suspension of TiO$_2$/MeOH (15 wt % in MeOH, commercially available from Sakai chemical), and then adding to this mixture 1 wt % of Irgacure 184 (a radical photoinitiator marketed by BASF). The methanol of the resulting composition was evaporated under reduced pressure.

Then, each composition was applied between two glass plates separated by a spacer of 500 μm. Photopolymerization was performed by illumination with a Hg lamp during 10 min (1.7 J.cm$^{-2}$). A silicon spacer of 500 μm was used between the two glass substrates.

The refractive index and Haze were measured as for example 2.

The refractive indexes at 594 nm, Abbe numbers and front scattering of the resulting materials are indicated in Table 8.

TABLE 8

| Optical properties | 0 wt % | 10 wt % | 20 wt % | 30 wt % |
|---|---|---|---|---|
| 594 nm | 1.506 | 1.524 | 1.566 | 1.617 |
| δn | — | 0.018 | 0.006 | 0.111 |
| Abbe Number | 57 | 44 | 33 | 27 |
| T (400 nm) | 86% | 23% | 1% | 1% |

In table 9 below, materials obtained according to the above described method from a composition containing 3-PA and 30 wt % of ZrO$_2$ nanoparticles or 30 wt % of TiO$_2$ nanoparticles are compared.

TABLE 9

| 30 wt % | ZrO2 | TiO2 |
|---|---|---|
| 594 nm | 1.555 | 1.617 |
| δn | 0.049 | 0.111 |
| Abbe Number | 52 | 27 |
| T (400 nm) | 75% | 1% |

The data of table 9 show that the transmission of a 3PA material containing TiO2 nanoparticles is much lower than the transmission of the same material comprising ZrO2 nanoparticles. However, it is to be noted that the particle size of TiO2 used to prepare this material is higher than the particle size of ZrO2. Thus, the transmission of a 3-PA composition containing TiO2 nanoparticles should be increased by using TiO2 nanoparticles of lower particle size and by choosing a monomer having a higher refractive index than 3-PA.

The invention claimed is:

1. A liquid polymerizable composition suitable for preparing a transparent optical article, said composition comprising:
    a liquid monomer composition comprising:
        a phosphine oxide of formula (Ia):

wherein:
       at least one among $R_1a$, $R_2a$ and $R_3a$, identical or different, represents:
           —(R4)$_n$—X—(R5—Y)$_m$—(R6)$_p$-Q wherein:
           R4, R5 and R6, identical or different, represent a C1-C6 alkylene group, one or several carbon atoms of which may be replaced with a phenylene group,
           X and Y, identical or different, represent O or S, n=0,
           m and p, identical or different, represent an integer from 0 to 4,
           Q represents a polymerizable function selected from the group consisting of acrylate, methacrylate, and thiol, and
       the other(s) among $R_1a$, $R_2a$ and $R_3a$, identical or different, represent(s) an hydrogen atom, a phenyl, an C1-C6 alkoxy, C1-C6 alkylthio, aryloxy, arylthio, aryl C1-C6 alkoxy, or aryl C1-C6 alkylthio, or
    a mixture of two different monomers M1 and M2 which are able to react together and form the phosphine oxide of formula (Ia), wherein M1 or M2 or both M1 and M2 contain the function P=X and M1 and M2 further contain functions which are able to react together to form a polymer, and
    ZrO$_2$ nanoparticles homogeneously dispersed in said monomer of formula (I) or in said mixture of two different monomers M1 and M2 which are able to react together and form the phosphine oxide of formula (Ia),
    wherein said liquid polymerizable composition is transparent after polymerization so that it is suitable for preparing a transparent optical article,
    wherein the amount of said ZrO$_2$ nanoparticles in the polymerizable composition is comprised between 5 and 50% w/w, based on the total weight of the liquid polymerizable composition,
    wherein the particle size of the ZrO$_2$ nanoparticles is less than 50 nm, and
    wherein said liquid polymerizable composition after polymerization has a refractive index higher than 1.511 at 594 nm.

2. The liquid polymerizable composition of claim 1, wherein said phosphine oxide of formula (Ia) is selected from the group consisting of:

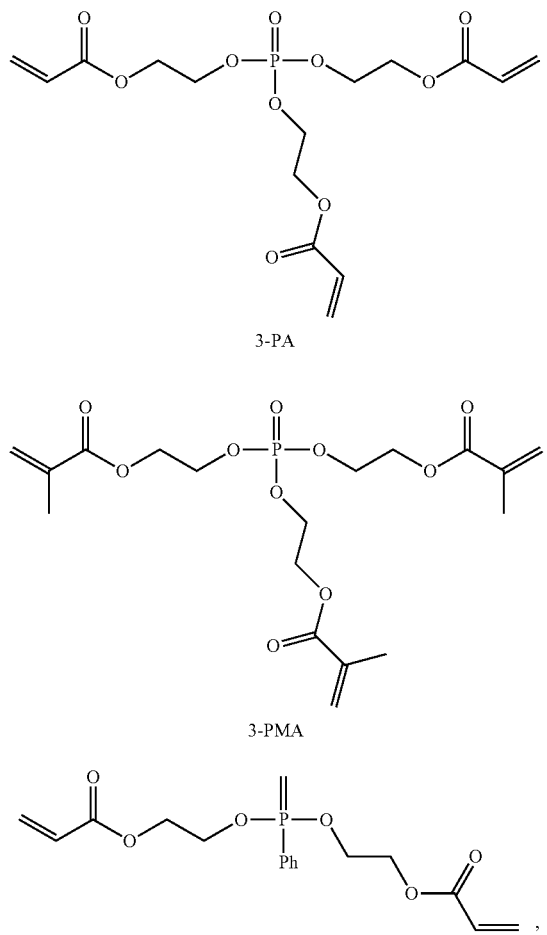

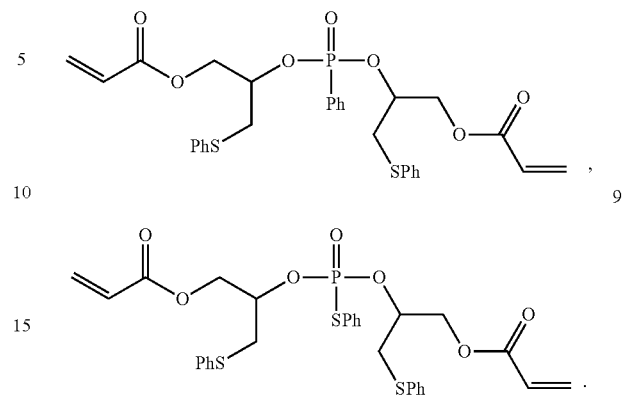

3. The liquid polymerizable composition of claim 1, wherein the amount of said $ZrO_2$ nanoparticles in the polymerizable composition is comprised between 10 and 40% w/w, based on the total weight of the liquid polymerizable composition.

4. The liquid polymerizable composition of claim 1, wherein the amount of said $ZrO_2$ nanoparticles in the polymerizable composition is comprised between 30 and 35% w/w, based on the total weight of the liquid polymerizable composition.

5. The liquid polymerizable composition of claim 1, wherein said $ZrO_2$ nanoparticles have a particle size between 30 nm and 5 nm.

6. The liquid polymerizable composition of claim 1, further comprising a mold release agent, a photostabilizer, an antioxidant, a dye-anti-coloring agent, a filler, a UV light absorber or an optical brightener.

* * * * *